(12) United States Patent
Willinger et al.

(10) Patent No.: US 7,392,763 B2
(45) Date of Patent: Jul. 1, 2008

(54) BIRDCAGE FEEDER

(75) Inventors: Jonathan Willinger, Tenafly, NJ (US);
Klaus Woltmann, Demarest, NJ (US)

(73) Assignee: JW Pet Company, Inc., Teterboro, NJ (US)

( * ) Notice: Subject to any disclaimer, the term of this patent is extended or adjusted under 35 U.S.C. 154(b) by 0 days.

(21) Appl. No.: 10/910,242

(22) Filed: Aug. 3, 2004

(65) Prior Publication Data

US 2005/0028749 A1 Feb. 10, 2005

Related U.S. Application Data

(63) Continuation-in-part of application No. 10/371,646, filed on Feb. 21, 2003, now Pat. No. 6,971,332.

(60) Provisional application No. 60/370,200, filed on Apr. 5, 2002.

(51) Int. Cl.
*A01K 39/01* (2006.01)
*A01K 5/00* (2006.01)

(52) U.S. Cl. .................. 119/464; 119/475; 119/57.8

(58) Field of Classification Search ............... 119/52.1, 119/52.2, 57.8, 454, 464, 475, 477, 53, 465, 119/467, 51.01, 705, 51.03, 72, 72.5, 73, 119/74, 78, 80
See application file for complete search history.

(56) References Cited

U.S. PATENT DOCUMENTS

| 1,239,151 | A | * | 9/1917 | Woods | 119/464 |
| 1,450,494 | A | * | 4/1923 | Eummelen | 119/464 |
| 1,718,432 | A | * | 6/1929 | Qualmann | 119/464 |
| 1,755,706 | A | * | 4/1930 | St George | 119/464 |
| 2,031,874 | A | * | 2/1936 | Butler et al. | 119/464 |
| 2,066,264 | A | * | 12/1936 | Fisher | 119/53 |
| 2,699,752 | A | * | 1/1955 | Reyes | 119/464 |
| 2,943,600 | A | * | 7/1960 | Rosoff | 119/464 |
| 3,017,859 | A | * | 1/1962 | Stern | 119/57.8 |
| 3,185,133 | A | * | 5/1965 | Bird | 119/477 |
| 4,574,738 | A | * | 3/1986 | Tominaga | 119/464 |
| 4,732,112 | A | * | 3/1988 | Fenner et al. | 119/52.2 |
| 5,351,645 | A | * | 10/1994 | Brennon | 119/475 |
| 5,397,033 | A | * | 3/1995 | Blomquist | 222/185.1 |
| 5,771,838 | A | * | 6/1998 | Bloom et al. | 119/52.2 |
| 5,893,338 | A | * | 4/1999 | Campbell et al. | 119/475 |
| 6,158,388 | A | * | 12/2000 | Wenstrand | 119/464 |

FOREIGN PATENT DOCUMENTS

FR 2529751 A1 * 1/1984
FR 2561867 A * 10/1985

* cited by examiner

*Primary Examiner*—Son T. Nguyen
(74) *Attorney, Agent, or Firm*—Katten Muchin Rosenman LLP

(57) ABSTRACT

A birdcage feeding device is provided with a seed chamber, seed cup, and method of attachment. The feeding device comprises an opening that may be opened or closed in order to displace seeds from a feeding chamber to fill a seed cup. The seed cup is designed to be shallow such that seeds do not get buried under layers of empty shells and hulls. The seed cup also has high rear and side walls to guard seeds from being scattered outside by birds. The feeding device may be closed to allow a user to remove the seed cup, without removing the device, for cleaning. A method of attachment is also described that allows the device to be on the outside of the birdcage while being secured from the inside of the cage, thus allowing for easy refilling of the device.

44 Claims, 8 Drawing Sheets

BIRDCAGE FEEDER

RELATED APPLICATIONS

The present application is a continuation-in-part of U.S. application Ser. No. 10/371,646 filed Feb. 21, 2003 now U.S. Pat. No. 6,971,332, which claims priority under 35 U.S.C. 119(e) from U.S. Application 60/370,200 filed Apr. 5, 2002.

BACKGROUND OF THE INVENTION

1. Field of Invention

The present invention relates generally to the field of birdcage attachments. More specifically, the present invention is related to birdcage feeding devices.

2. Discussion of Prior Art

Current birdcage attachments that store bird seed are inefficient. One prior method of storing seed may be to place the seed in a cup that attaches to the inside of the cage bars. A problem with this method is that seed often spills while filling the cup or while placing it in the cage. Further, birds may scatter seeds outside the cage while feeding, or sit on the edge of the cup and possibly defecate into the cup, spoiling the seeds. Other existing methods utilize a seed chamber that feeds into a cup to allow birds' access to the food. However, the chamber is typically filled and the entire unit is mounted on the outside of a cage. A major disadvantage, besides those mentioned above, is that the entire unit must be removed from the cage for refilling. Also, when removing the seed chamber, if the chamber is not completely empty, seeds that are still in the chamber may fall out into the cup, cage, and outside of the cage. Furthermore, both prior methods utilize cups that tend to be deep. The deeper cups typically accumulate layers of empty seed shells and husks, thus burying seeds. Often, bird keepers discard a large amount of good seeds since it appears that the cups are filled with only empty shells.

There is, therefore, a desire for a birdcage feeding device that allows for easy refilling of a seed chamber without the possibility of spilling and a device that reduces wasting good bird feed while allowing for easy mounting and dismounting of the chamber from a cage.

Whatever the precise merits, features, and advantages of the above cited references, none of them achieves or fulfills the purposes of the present invention.

SUMMARY OF THE INVENTION

A birdcage feeding device is provided having a unique seed cup and holder. The seed cup comprises extended rear and side walls for preventing spilling of seeds and protecting seed contamination via bird defecation. The seed cup also has a shallow opening for holding only a few layers of seed in order to prevent waste. The holder is mounted to the birdcage such that a seed cup may be removed without removing the entire device from the birdcage. The holder is preferably mounted to the outside of the birdcage, thus allowing for easily refilling the feed chamber of seed. Fasteners are used for the attachment of the seed cup to the holder. The use of posts on the holder for preventing the spilling of seed is also described.

DESCRIPTION OF THE PREFERRED EMBODIMENTS

Figure 1A:
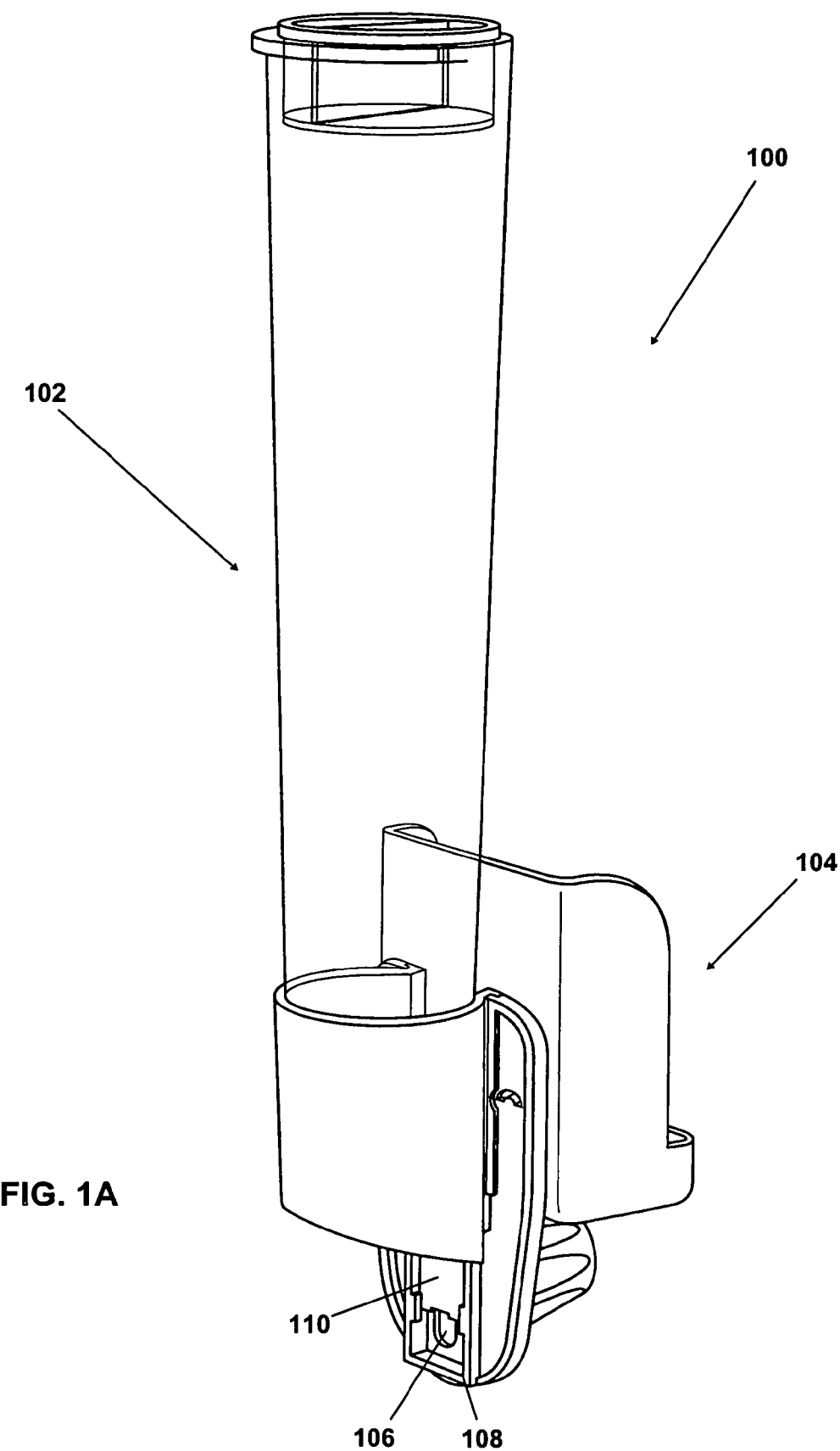
FIG. 1a illustrates a birdcage feeding device of the present invention.
Figure 1B:
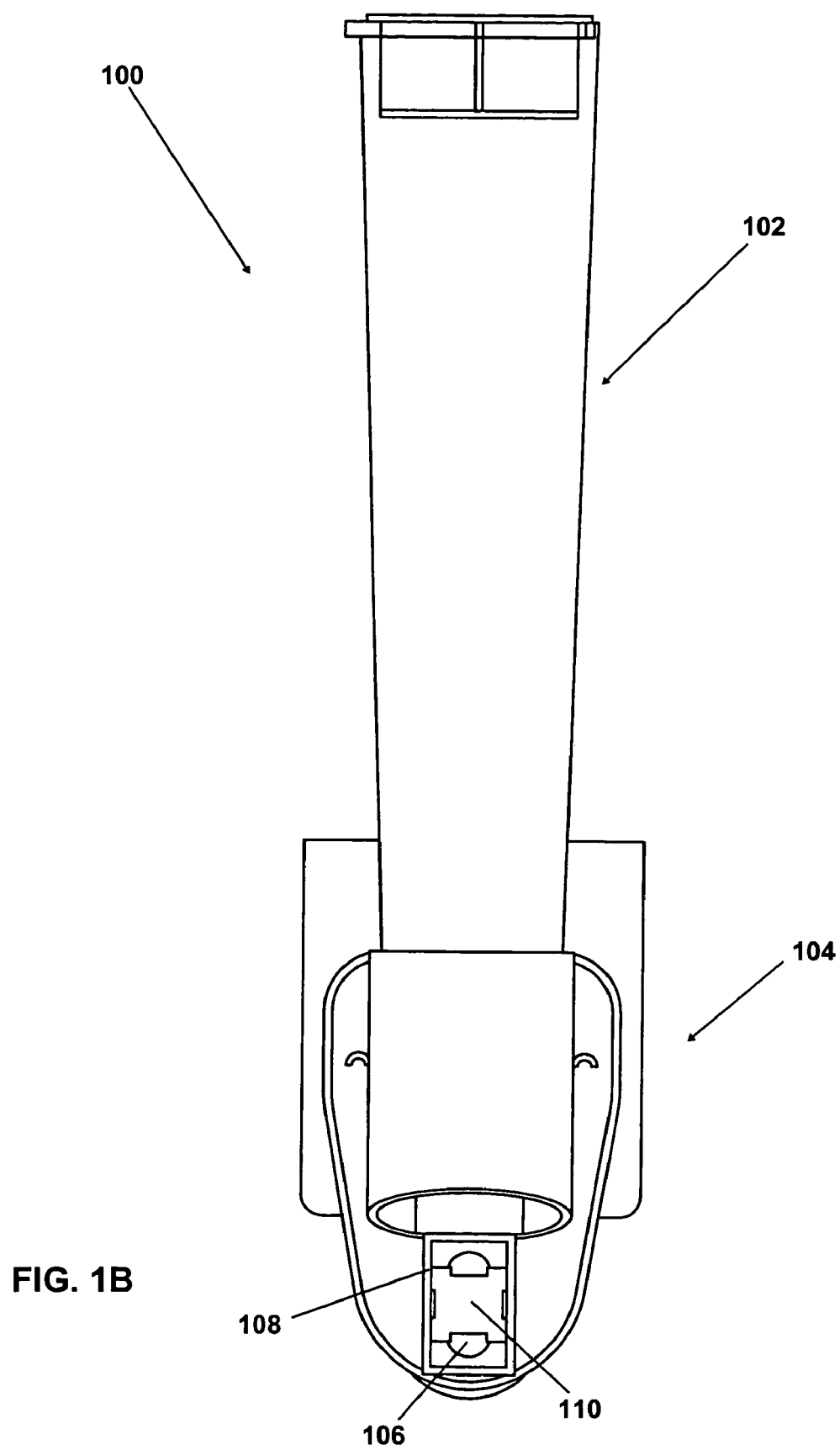
FIG. 1b illustrates a rear view of the birdcage feeding device.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIGS. 1a, 1b, 1c, and 1d illustrate perspective, rear, front, and side views (respectively) of a birdcage attachment; specifically, a feeding device that allows for easy refilling and allows small birds to acquire and eat seeds inside a birdcage. As shown in FIGS. 1a-1d, birdcage feeding device 100 comprises seed holding device 102, designed to be located on the outside of the cage and to deliver seed gravitationally, and attachment device 104, designed to be secured to a mounting plate on the birdcage from the outside of the cage. The attachment of the device 100 is discussed in further detail below.

Figure 2:
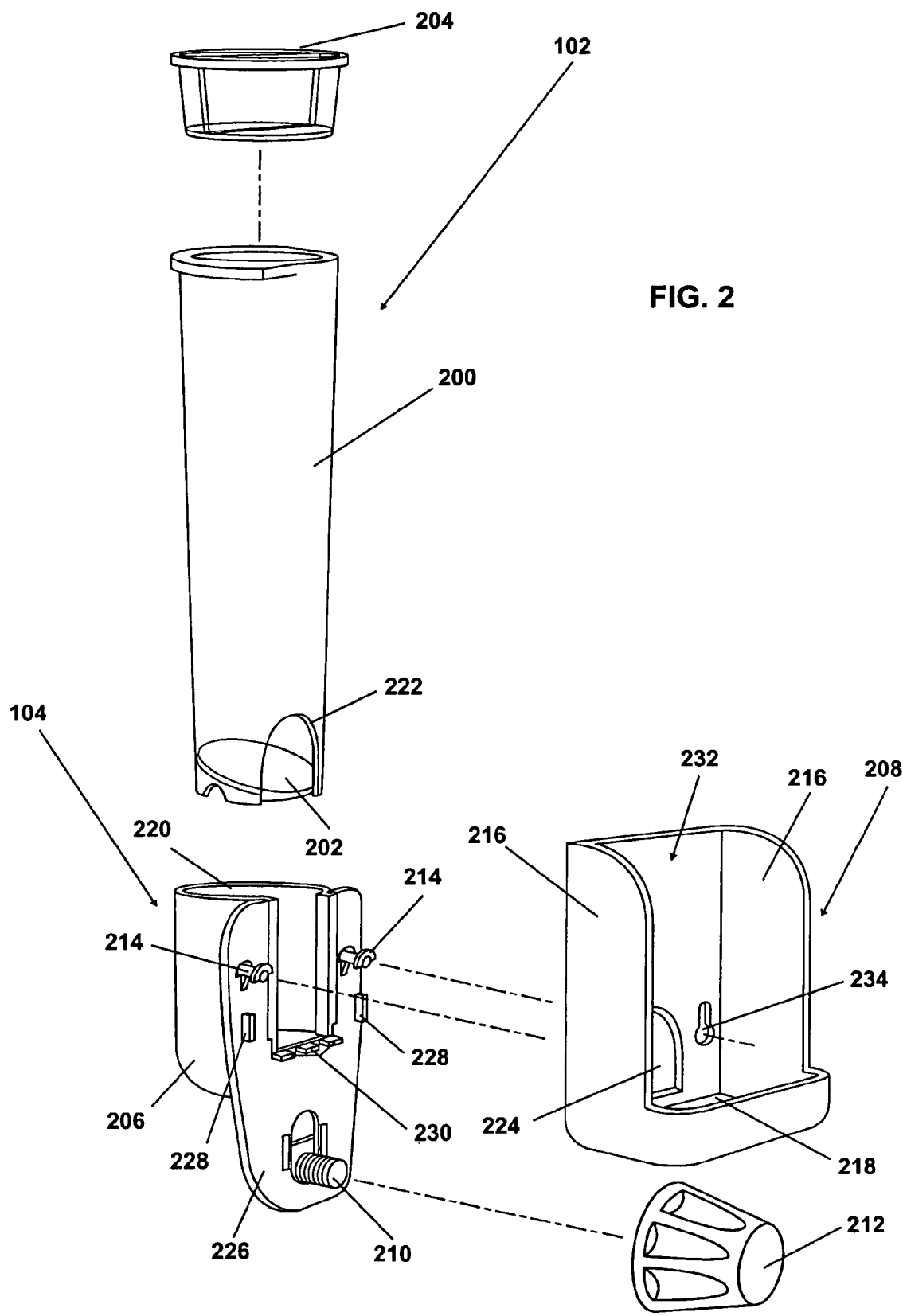
FIG. 2 illustrates the components of the birdcage feeding device.

FIG. 2 illustrates the components of the birdcage feeding device of the present invention. Seed holding device 102 of the present invention comprises feed chamber 200, ramp 202, outflow opening 222, and cap 204. Ramp 202 is angled such that the seed in chamber 200 flows easier through outflow opening 222. Cap 204 is designed to be placed into the top of feed chamber 200. The top of feed chamber 200 is discussed in greater detail in FIG. 4 below.

Attachment device 104 comprises holder 206, screw post 210, nut 212, fasteners 214, and mounting plate 226. Although a screw post is illustrated in the figures, it should be noted that any type of mechanism, such as a push-lock, snap-lock, or the like that allow the holder to be locked from the inside of the birdcage and secure the feeding device to the birdcage may also be used. Furthermore, referring back to FIGS. 1a and 1b, fastener 210 preferably comprises a restraining device 110 within opening 108 of mounting plate 226. Fastener 210 is placed through hole 106 of mounting plate 226 to connect with cap 212. As fastener 210 is tightened, restraining device 110 slides within opening 108 to tighten around a birdcage and device 100 is secured. Methods of attaching device 100 to a birdcage are further discussed in FIGS. 3A and 3B.

Holder 206 comprises opening 220 allowing seed holding device 102 to be inserted therein. Holder 206 and mounting plate 226 have an opening to dispense seeds by gravity from seed holding device 102 and fasteners 214 that are to lock and hold internal seed cup 208. Seed cup 208 comprises opening 224 that is designed to align with holder 206 and outflow opening 222 of chamber 200 such that feed may flow out and into seed holding section 218. Seed cup 208 is removable and designed to hold a small amount of seed accessible to the bird(s) in the birdcage. Seed holding section 218 of seed cup 208 is shallow such that it is only able to hold a small number of layers, such as three or four layers of seed. This ensures that seeds do not get buried under layers of empty seed shells and husks, which tend to accumulate as the bird feeds. This also decreases the amount of wasted seed that may be discarded since empty shells will not cover all of the good seeds.

Preferably, as seen in FIG. 2, seed cup 208 has extended side guard walls 216 and rear wall 232. The high rear and sidewalls are designed to act as seed guards. Fewer seeds, then, are scattered outside the cup and cage as the birds are feeding. Besides their height, the extended side guard walls 216 are also designed to have a downward, curving shape to discourage birds from sitting and resting on the edge of the cup. This aids in reducing bird defecation into cup 208 that spoils the seeds held therein.

Figure 1C:
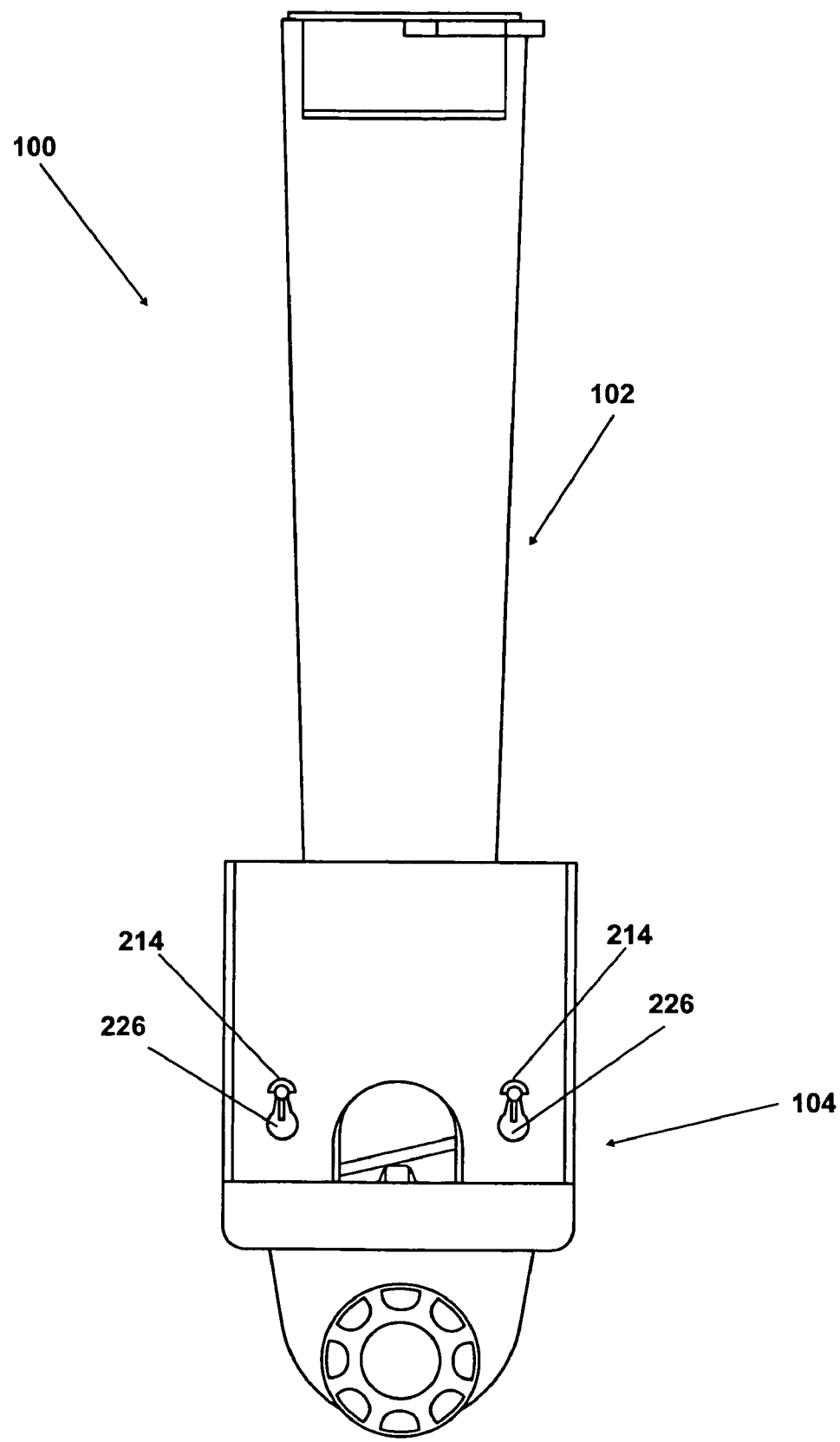
FIG. 1c illustrates a front view of the birdcage feeding device.
Figure 1D:
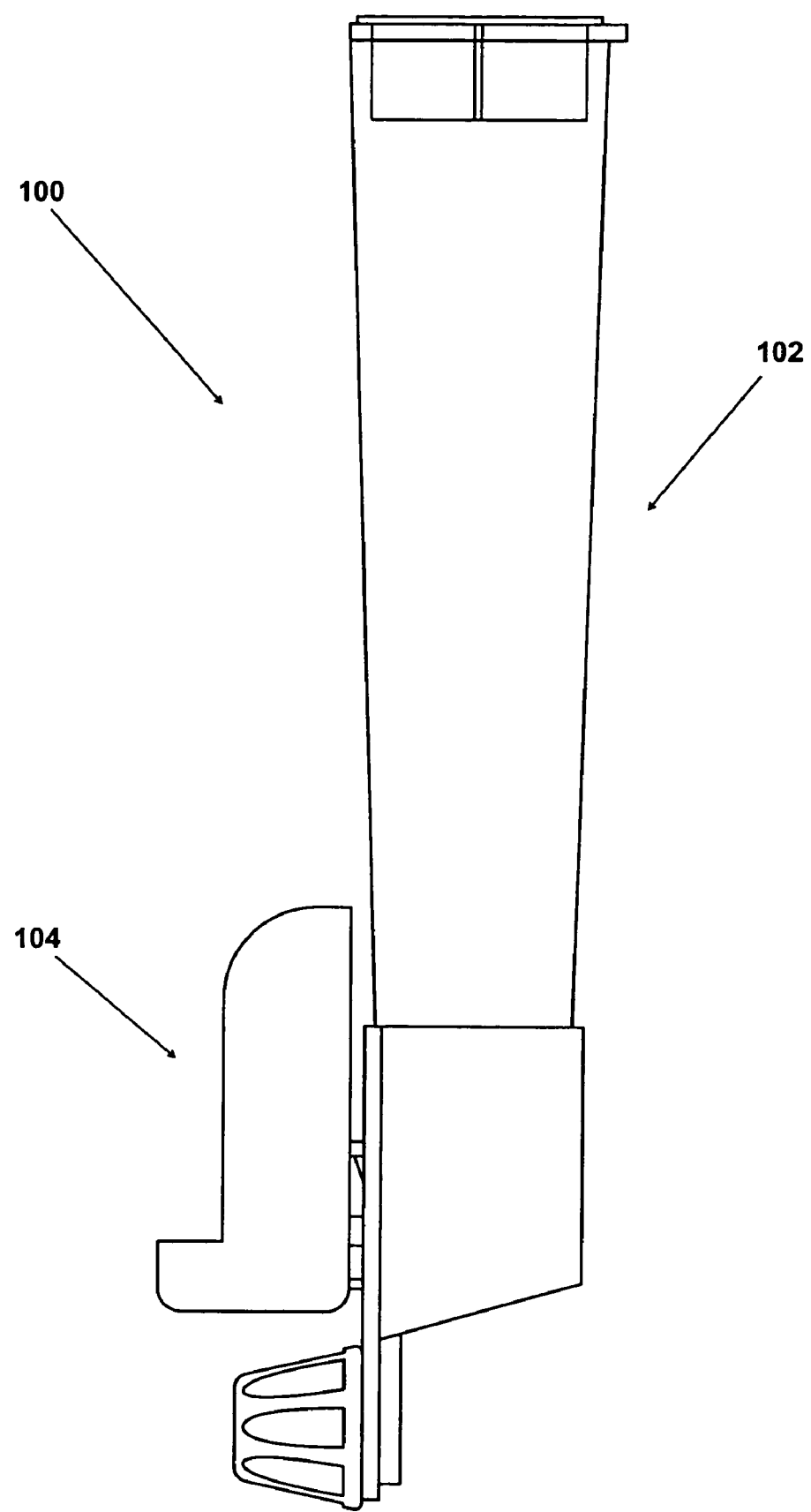
FIG. 1d illustrates a side view of the birdcage feeding device.

Seed cup 208 also has two elongated slots 234 (one shown) in rear wall 232 that allow the opening 224 of the cup to be aligned and locked with holder 206 so that seed is dispensed in seed holding section 218. Fasteners 214 of holder 206 are placed through slots 234 and the cup is locked into place by pulling cup 208 down. Fasteners 214 work with holder 206 to hold cup 208 in a steady state, as well as allow cup 208 to be removed without removing the entire device from the birdcage. FIG. 1c also illustrates how fasteners 214 are locked in slots 234.

Also illustrated in FIG. 2 are vertical and horizontal posts 228, 230 (respectively) on the face of mounting plate 226. Two vertical and three horizontal posts are shown; however, the amount of posts used on the mounting plate should not be limited to the number illustrated as any number of posts may perform a similar function. Posts 228 and 230 are provided to aid in mounting birdcage device 100 as well as work in conjunction with the bars of the birdcage to block the seed from falling out and on to the floor (as described below).

Figure 3A:
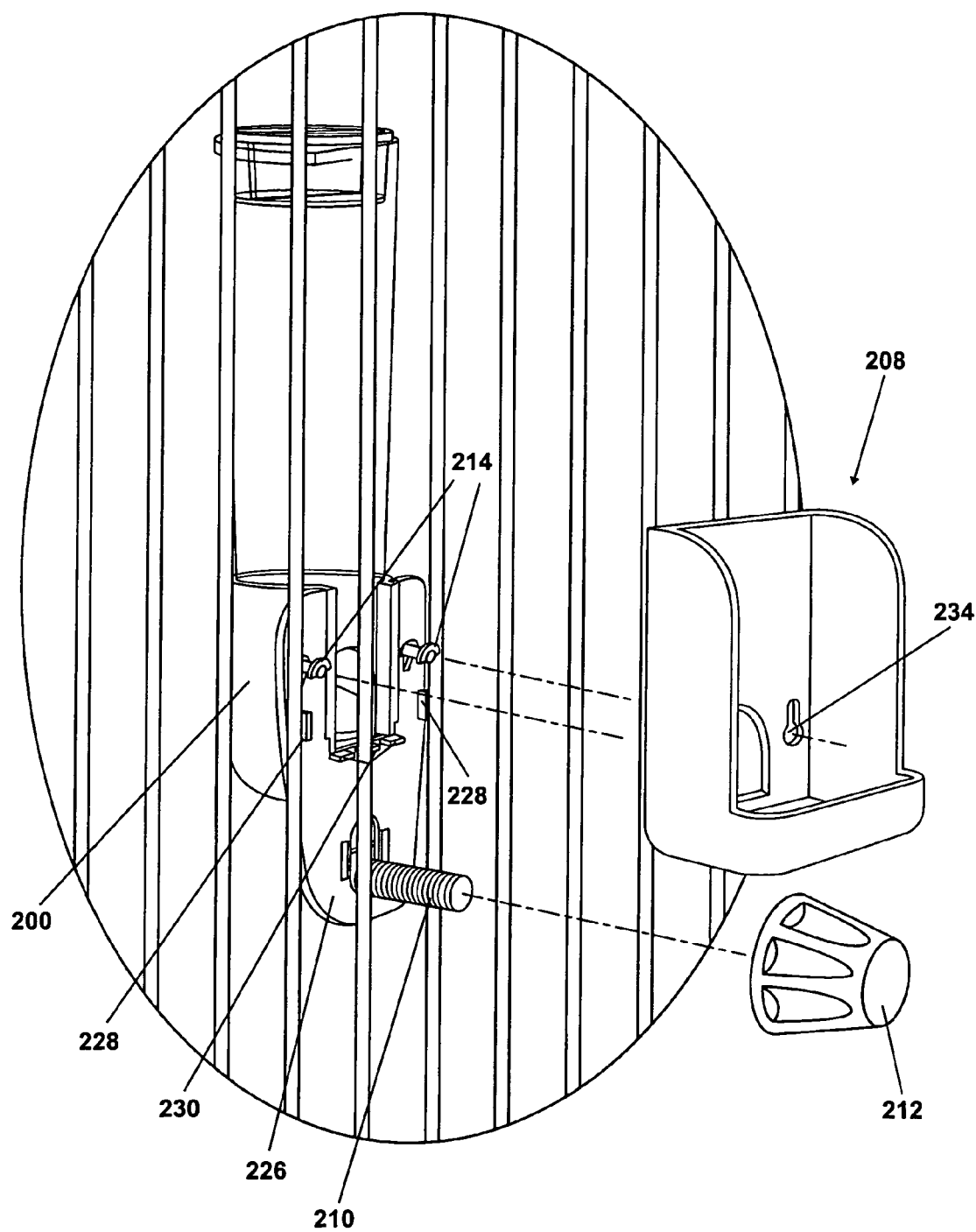
FIG. 3a illustrates the attachment of the birdcage feeding device to a birdcage with vertically spaced bars.
Figure 3B:
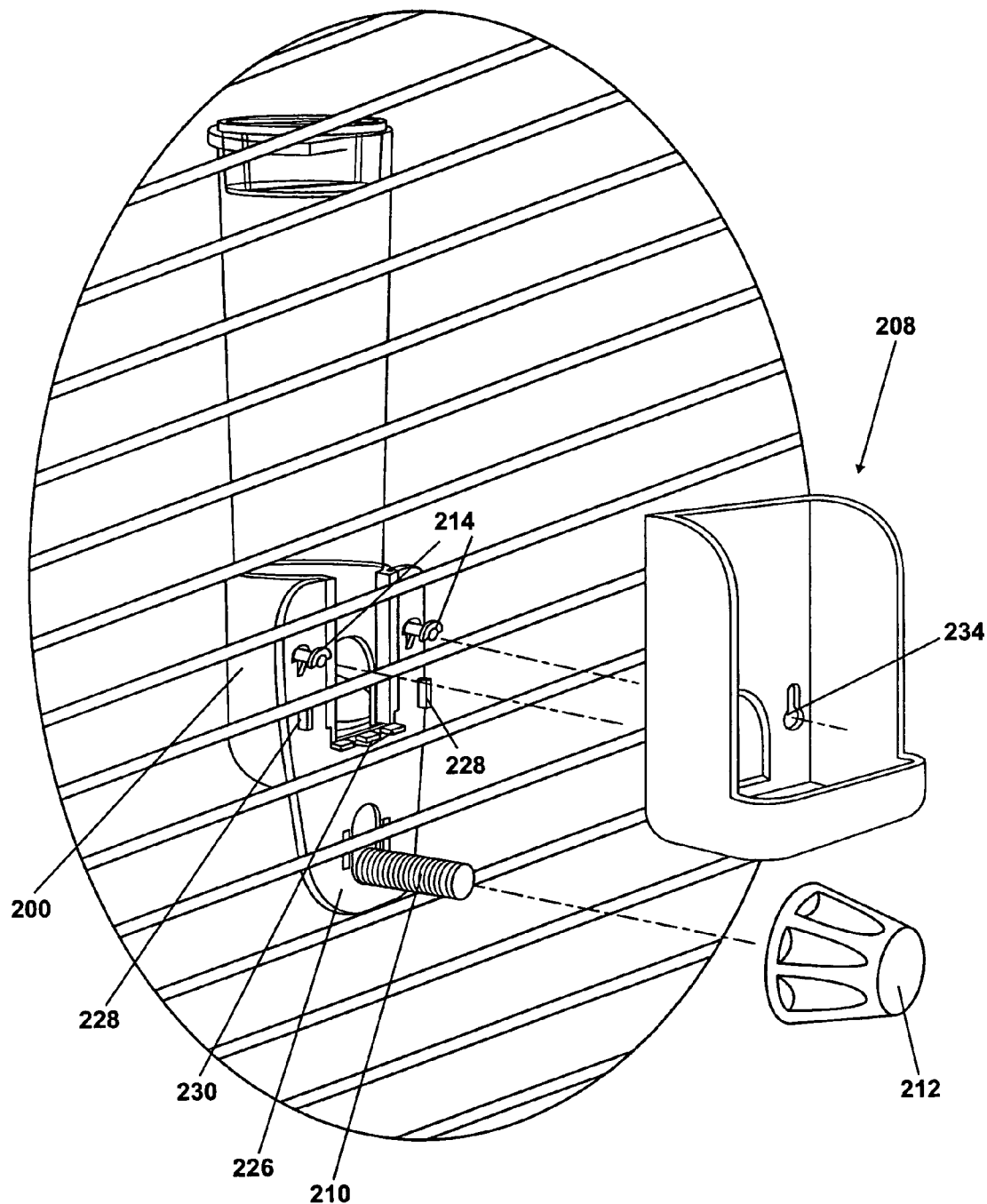
FIG. 3b illustrates the attachment of the birdcage feeding device to a birdcage with horizontally spaced bars.

FIGS. 3a and 3b illustrate the method of attachment of the birdcage feeding device to vertically-oriented bars and horizontally-oriented bars, respectively. As previously mentioned, the method of attachment allows seed holding device 102 and holder 206 to be on the outside of the birdcage while being secured from the inside of the cage. Holder 206 is designed to be attached to the outside of the cage via mounting plate 226, screw post 210 and nut 212. Screw post 210 and fasteners 214 of mounting plate 226 are placed through the bars of the birdcage. As shown in FIG. 3a, vertical posts 228 are positioned such that they will fit between the vertical bars of a birdcage. Horizontal bars 230 are spaced between the bars of the birdcage and thus space the device in order to prevent the seed from falling out and onto the floor. On the contrary, FIG. 3b illustrates the method of positioning horizontal posts 230 such that they will fit with the horizontal bars of a birdcage. Vertical bars 228 in this case are spaced between the horizontal bars and thus serve to space the device and to prevent the seed from falling out and onto the floor. Once the device is positioned with the birdcage, seed cup 208 is placed inside the cage such that the fasteners 214 align and lock in slots 234 of rear wall 232 of seed cup 208. Also, nut 212 is screwed onto screw post 210 from the inside of the birdcage until holder 206 is locked in place.

Figure 4:
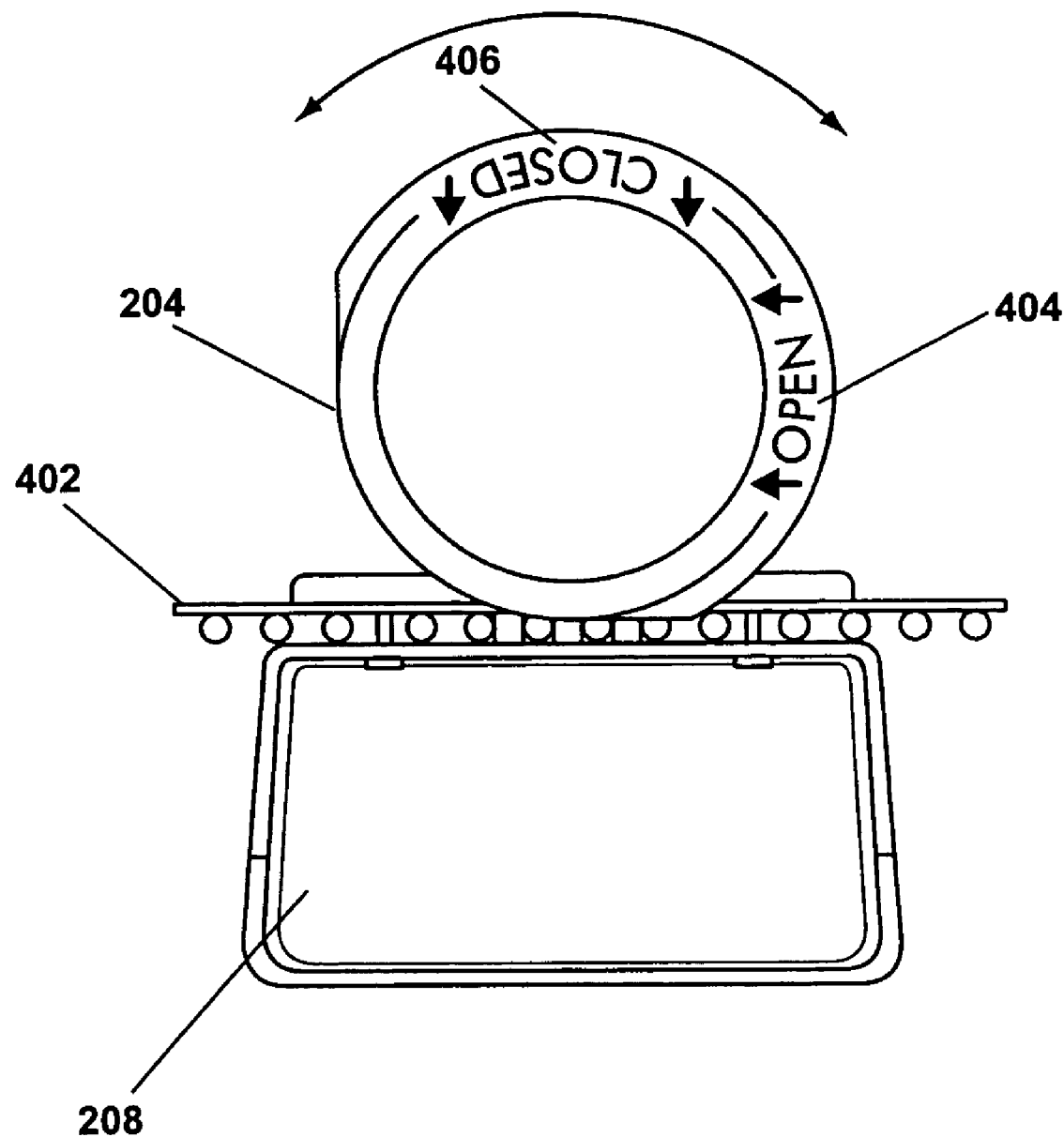
FIG. 4 illustrates a top view showing an open-close guide of the seed reservoir.

The top of feed chamber 200 is illustrated in greater detail in FIG. 4. FIG. 4 illustrates a top view of birdcage feeding device 100 assembled on cage 402. Feeding chamber 200 is located on the outside the birdcage and cup 208 is shown on the inside of the birdcage. Chamber 200 comprises an "open" position 404 or "close" position 406. As previously shown, chamber 200 comprises ramp 202 and outflow opening 222 to allow feed to flow out. In the preferred embodiment, chamber 200 may rotate from an on-off or open-closed position. That is, a user may rotate chamber 200 such that outflow opening is "closed" 406. Similarly, a user may also rotate chamber 200 to an "open" position 404 to allow seed to flow into cup 208. The positions are designed to be used as a guide for allowing or prohibiting seed delivery from chamber 200 to cup 208.

To refill chamber 200, cap 204 is easily removed from the top of feeding chamber 200, and seeds may be poured into the top of chamber 200. To clean cup 208, a user must rotate feed chamber 200 to a "close" position 406, then lift cup 208 such that the holes in the cup unlock and are withdrawn from fasteners 214. Thus, contrary to prior art devices, the entire birdcage feeding device 100 never has to be detached from the cage when refilling chamber 200 or cleaning seed cup 208.

CONCLUSION

A system and method has been shown in the above embodiments for the effective implementation of a birdcage feeding device. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques. The design and shape of the seed chamber, holder, and seed cup should not be limited to those shown in the figures such that they perform the same function and method of attachment to the cage. Finally, the type of fastener and cap construction and method for locking the devices together such that the birdcage watering device is secured to the cage should also not be limited to the screw fastener as shown in the figures.

The invention claimed is:

1. A birdcage feeder for a birdcage having a wall made of a plurality of substantially parallel cage bars, the birdcage feeder comprising:
   a holder disposed on a first side of the wall;
   a seed holding device held in the holder and removable from the holder, the seed holding device comprising a seed chamber and an exit for delivering seed;
   a seed cup for receiving seeds from the seed holding device; the seed cup disposed against a second side of the wall, the seed cup removably attached to the holder;
   wherein one of the plurality of cage bars is sandwiched between the holder and the seed cup when the seed cup is attached to the holder
   wherein the holder is mountable to the wall,
   wherein when the holder is mounted to the wall, the seed cup may be detached from the holder and the seed holder may be removed from the holder without dismounting the holder from the wall.

2. The birdcage feeder of claim 1, wherein the seed passes from the exit to the seed cup between adjacent cage bars.

3. The birdcage feeder of claim 2, wherein the mounting plate comprises a fastener for locking the seed cup to the mounting plate.

4. The birdcage feeder of claim 2, further comprising a post and nut for securing a mounting plate to the wall.

5. The birdcage feeder of claim 1, wherein the seed holding device comprises an angled ramp to induce gravitational feed of seed.

6. The birdcage feeder of claim 1, wherein the seed holding device comprises a lid of which may be removed for refilling the chamber.

7. The birdcage feeder of claim 1, wherein the holder comprises a mounting plate for mounting against one of the plurality of cage bars.

8. The birdcage feeder of claim 1, the holder comprising a post for facilitating a mounting of the seed cup to the holder and preventing errant dislocation of the seed cup which causes seed from falling out of said seed cup.

9. The birdcage feeder of claim 1, wherein the seed cup has a shallow seed holding section.

10. The birdcage feeder of claim 1, wherein the seed cup has an opening aligning with the exit of said seed holding device.

11. The birdcage feeder of claim 1, wherein the seed cup comprises a guard wall on a side of the seed cup.

12. The birdcage feeder of claim 11, wherein the guard wall transitions from an extended position to a shallow position.

13. The birdcage feeder of claim 11, wherein the guard wall is configured for being disposed against the wall of the birdcage when the seed cup is attached to the holder.

14. The birdcage feeder of claim 1, wherein the holder comprises a pair of posts for engaging a pair of cage bars of the plurality of cage bars to limit movement of the holder relative to the birdcage.

15. The birdcage feeder of claim 14, wherein the holder comprises a mounting post for mounting the seed cup to the holder.

16. The birdcage feeder of claim 1, wherein the holder comprises an extension for fitting through the wall of the birdcage to prevent spillage of seeds when seeds are received by the seed cup from the seed holding device.

17. A birdcage feeder mountable to a birdcage comprising a wall having cage bars; the birdcage feeder comprising:
a seed holding device comprising a seed chamber, the seed chamber having an exit near its base for delivering seed;
a holder for receiving and removably holding the seed holding device to a first side of the wall, the holder mountable to the outside of the birdcage, the holder having an opening to gravitationally pass seed from the exit of said seed chamber when the seed holding device is in an open position, and
a seed cup disposed to a second side of the wall, the seed cup being removably attached to the holder, the seed cup receiving seeds passing between the cage bars from the seed holding device;
wherein when the holder is mounted to the wall, the seed cup may be detached from the holder and the seed holder may be removed from the holder without dismounting the holder from the wall.

18. The birdcage feeder of claim 17, wherein the seed holding device and the seed cup are disengageable from the holder independent of each other.

19. The birdcage feeder of claim 17, wherein the seed holding device twists to a closed position while in the holder.

20. The birdcage feeder of claim 17, being configured for sandwiching one of the plurality of cage bars between the holder and the seed cup when the seed cup is attached to the holder.

21. The birdcage feeder of claim 17, wherein the seed holding device comprises an angled ramp to induce gravitational feed of seed.

22. The birdcage feeder of claim 17, wherein the seed chamber comprises a lid removed for refilling said chamber.

23. The birdcage feeder of claim 17, wherein the holder comprises a mounting plate.

24. The birdcage feeder of claim 23, further comprising a post and nut for securing the mounting plate to the first side of the wall.

25. The birdcage feeder of claim 17, wherein the holder comprises fasteners for attaching the seed cup to the holder.

26. The birdcage feeder of claim 17, wherein the holder comprises a post for attaching the seed cup to the holder and preventing errant dislocation of the seed cup which causes seed from falling out of said seed cup.

27. The birdcage feeder of claim 17, wherein said seed cup has a shallow seed holding section.

28. The birdcage feeder of claim 17, wherein the seed cup has an opening aligning with the exit of the seed holding device.

29. The birdcage feeder of claim 17, wherein said seed cup has an extended guard wall.

30. The birdcage feeder of claim 29, wherein the guard wall comprises a side wall having a downward, curving shape.

31. The birdcage feeder of claim 17, wherein the holder comprises a mounting plate and wherein the seed cup comprises a guard wall that engages a fastener on the mounting plate to secure one of the plurality of cage bars between the holder and the seed cup.

32. The birdcage feeder of claim 17, wherein the holder comprises a pair of posts that engage a pair of cage bars of the plurality of cage bars to limit movement of the holder relative to the birdcage.

33. The birdcage feeder of claim 32, wherein the posts are configured for limiting the movement of holder in one of vertical and horizontally oriented cage bars.

34. The birdcage feeder of claim 17, wherein the holder comprises an extension for fitting the wall to prevent spillage of seeds when seeds are received by the seed cup from the seed holding device.

35. A birdcage feeder mountable on a plurality of cage bars, the birdcage feeder comprising:
a seed holding device comprising a seed chamber and an exit for delivering seed,
a holder for receiving and removably holding the seed holding device to a first side of the plurality of cage bars; and
a seed cup disposed on a second side of the plurality of cage bars and being removably attached to said holder, one of the plurality of cage bars being disposed between holder and the seed cup;
wherein the holder is mountable to the plurality of cage bar,
wherein when the holder is mounted to the plurality of cage bars, the seed cup may be detached from the holder and the seed holder may be removed from the holder without dismounting the holder from the plurality of cage bars.

36. The birdcage feeder of claim 35, wherein the seed holding device and the seed cup are disengageable from the holder independent of each other.

37. The birdcage feeder of claim 35, wherein the holder comprises an extension for fitting through the plurality of cage bars to prevent spillage of seeds when seeds are received by the seed cup from the seed holding device.

38. The birdcage feeder of claim 35, wherein the seed holding device is rotatable from an open to closed position, delivering seed from the seed chamber to the seed cup when in the open position.

39. The birdcage feeder of claim 35, wherein the holder comprises a pair of posts for engaging a pair of cage bars of the plurality of cage bars to limit movement of the holder relative to the plurality of cage bars.

40. The birdcage feeder of claim 35, wherein the holder comprises a posts for engaging a cage bar of the plurality of cage bars to limit movement of the holder relative to the plurality of cage bars.

41. The birdcage feeder of claim 35, wherein the holder comprises a mounting plate, the seed cup being removably attached to the mounting plate via fasteners.

42. The birdcage feeder of claim 35, further comprising a post and nut for securing the mounting plate to the plurality of cage bars.

43. The birdcage feeder of claim 35, wherein the holder comprises fasteners for engaging the seed cup.

44. The birdcage feeder of claim 35, wherein said holder comprises posts for facilitating the mounting of the seed cup to the holder and preventing errant dislocation of the seed cup which causes seed from falling out of said seed cup.

\* \* \* \* \*